United States Patent
Crockett et al.

(12)

(10) Patent No.: US 12,511,631 B2
(45) Date of Patent: *Dec. 30, 2025

(54) RADIO FREQUENCY IDENTIFICATION (RFID) SELF-CHECKOUT (SCO) STATION

(71) Applicant: Toshiba Global Commerce Solutions, Inc., Durham, NC (US)

(72) Inventors: Timothy W. Crockett, Raleigh, NC (US); Brad M. Johnson, Raleigh, NC (US); David John Steiner, Durham, NC (US); Kimberly Wood, Raleigh, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 282 days.

This patent is subject to a terminal disclaimer.

(21) Appl. No.: 18/127,233

(22) Filed: Mar. 28, 2023

(65) Prior Publication Data

US 2024/0330886 A1    Oct. 3, 2024

(51) Int. Cl.
*G06Q 20/18* (2012.01)
*G06K 7/10* (2006.01)
*G06Q 20/20* (2012.01)

(52) U.S. Cl.
CPC ......... *G06Q 20/18* (2013.01); *G06K 7/10366* (2013.01); *G06Q 20/208* (2013.01)

(58) Field of Classification Search
CPC .. G06Q 20/18; G06Q 20/208; G06K 7/10366; G07G 1/0018; G07G 1/0045; G07G 1/009

USPC .......................................................... 705/16
See application file for complete search history.

(56) References Cited

U.S. PATENT DOCUMENTS

2022/0302593 A1* 9/2022 Kornaros ................ H02J 50/12
2023/0266636 A1* 8/2023 Koch ..................... H04N 23/55
                                                                  396/452

OTHER PUBLICATIONS

Tsui, Chi Leung. Advancements in Beam Manipulation and Dynamic Control of Electromagnetic Waves Using Metamaterial Arrays and Voltage-Tunable Periodic Structures. University of Washington ProQuest Dissertations & Theses, 2023. (Year: 2023).*
Bernardini, Fabio et al. Retail Robots with UHF-RFID Moving Antennas enabling 3D Localization. 2022 IEEE 12th International Conference on RFID Technology and Applications (RFID-TA), 2022. (Year: 2022).*
Li, M. et al., "A Band-Notched Antenna With Two Radiation Zeros Using Grounded Coplanar Waveguide Filter for 2.4/5 GHz WLAN Applications", frontiers in Physics, vol. 9, Article 769949, Nov. 5, 2021, pp. 1-10, Frontier in Physics.

* cited by examiner

*Primary Examiner* — Florian M Zeender
*Assistant Examiner* — Fawaad Haider
(74) *Attorney, Agent, or Firm* — COATS & BENNETT, PLLC

(57) ABSTRACT

A Radio Frequency Identification (RFID) enabled Self-Checkout (SCO) station includes an RF antenna that emits RF energy, such as RFID interrogation signals, through a variable aperture of an aperture plate into a scan zone. The size of the scan zone is selectively varied by electrically modifying the effective size of the aperture in the aperture plate.

9 Claims, 11 Drawing Sheets

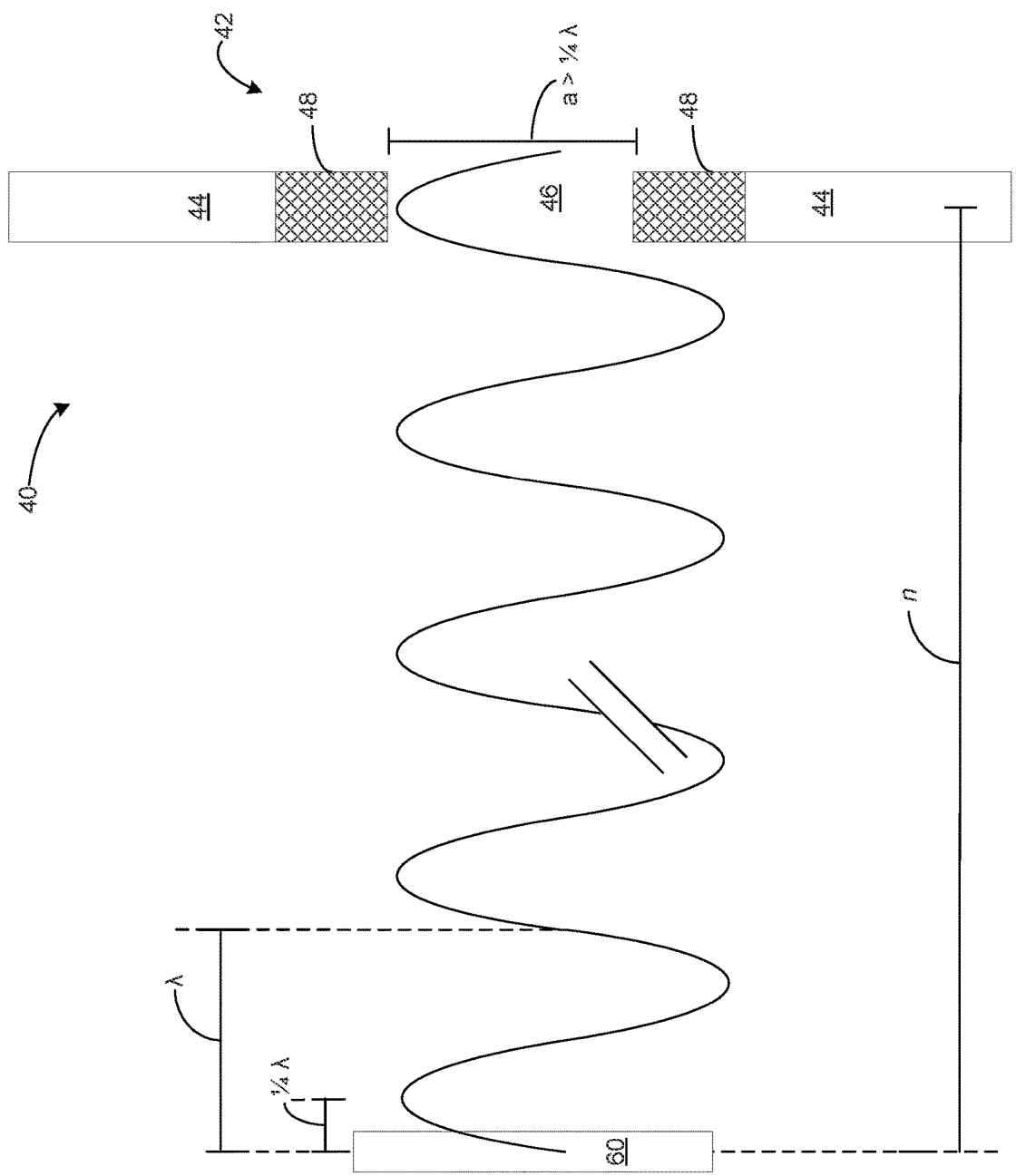

PROCESSING CIRCUITRY
140

RFID ANTENNA CONTROL UNIT/MODULE
150

SCAN ZONE ADJUSTER CONTROL UNIT/MODULE
152

PROXIMITY DETECTION UNIT/MODULE
154

TIMER UNIT/MODULE
156

INPUT/OUTPUT UNIT/MODULE
158

FIG. 9

RADIO FREQUENCY IDENTIFICATION (RFID) SELF-CHECKOUT (SCO) STATION

BACKGROUND

Radio Frequency Identification (RFID) self-checkout (SCO) stations currently enjoy increasing popularity in retail scenarios. Their popularity is due, in part, to the fact that they simplify scanning procedures and reduce the amount of time customers must spend checking out. With such systems, customers who are ready to checkout place a basket, for example, on the surface of a table of an SCO station. The basket contains all the products the customer has selected for purchase with each product having an associated RFID tag. Once placed on the table, an RFID antenna in the SCO station emits an interrogation signal triggering the RFID tags of all the products in the basket to send information about that product at once. Based on that received information, the SCO station identifies the products and displays the information identifying the products and their costs on a monitor for the customers. The customer can then pay for the products and leave the store.

BRIEF DESCRIPTION OF THE DRAWINGS

FIGS. 2A-2D illustrate an aperture plate and its function in adjusting a scan zone area according to one embodiment of the present disclosure.

FIG. 9 is a functional block diagram illustrating a computer program product configured to control a RFID-enabled SCO station according to embodiments of the present disclosure.

DETAILED DESCRIPTION

Embodiments of the present disclosure provide a self-checkout (SCO) station enabled with Radio Frequency Identification (RFID) capability. According to the present disclosure, customers place a container (e.g., a basket) containing the products they wish to purchase on the surface of the RFID-enabled SCO station. Each product in the basket has an associated RFID tag containing information that uniquely identifies the product (e.g., an inventory identifier). So positioned, an RFID antenna in the RFID-enabled SCO station emits an RF interrogation signal that triggers each RFID tag to transmit its information to an RFID receiver at the RFID-enabled SCO station. Based on the received information, the RFID-enabled SCO station identifies the products in the container and outputs the identifying information, along with the cost of the products, to a display for the customers.

In addition to these functions, however, an RFID-enabled SCO station of the present disclosure is specially configured to enhance security and reduce theft by customers. Particularly, not all customers will place their selected products into the basket on the surface of the RFID-enabled SCO station to be identified. Rather, unscrupulous customers will purposefully keep a product away from the RFID-enabled SCO station so the RFID tag associated with the product cannot be triggered to send its information. The present embodiments address such situations, however, by configuring the RFID-enabled SCO station to selectively vary (i.e., increase and decrease) the size of an aperture through which the RFID antenna emits the RF interrogation signals. This adjustment, in turn, dynamically increases and decreases the area in which the RFID tags are able to be triggered by the interrogation signals, and thus, detected by the RFID-enabled SCO station.

Figure 1:
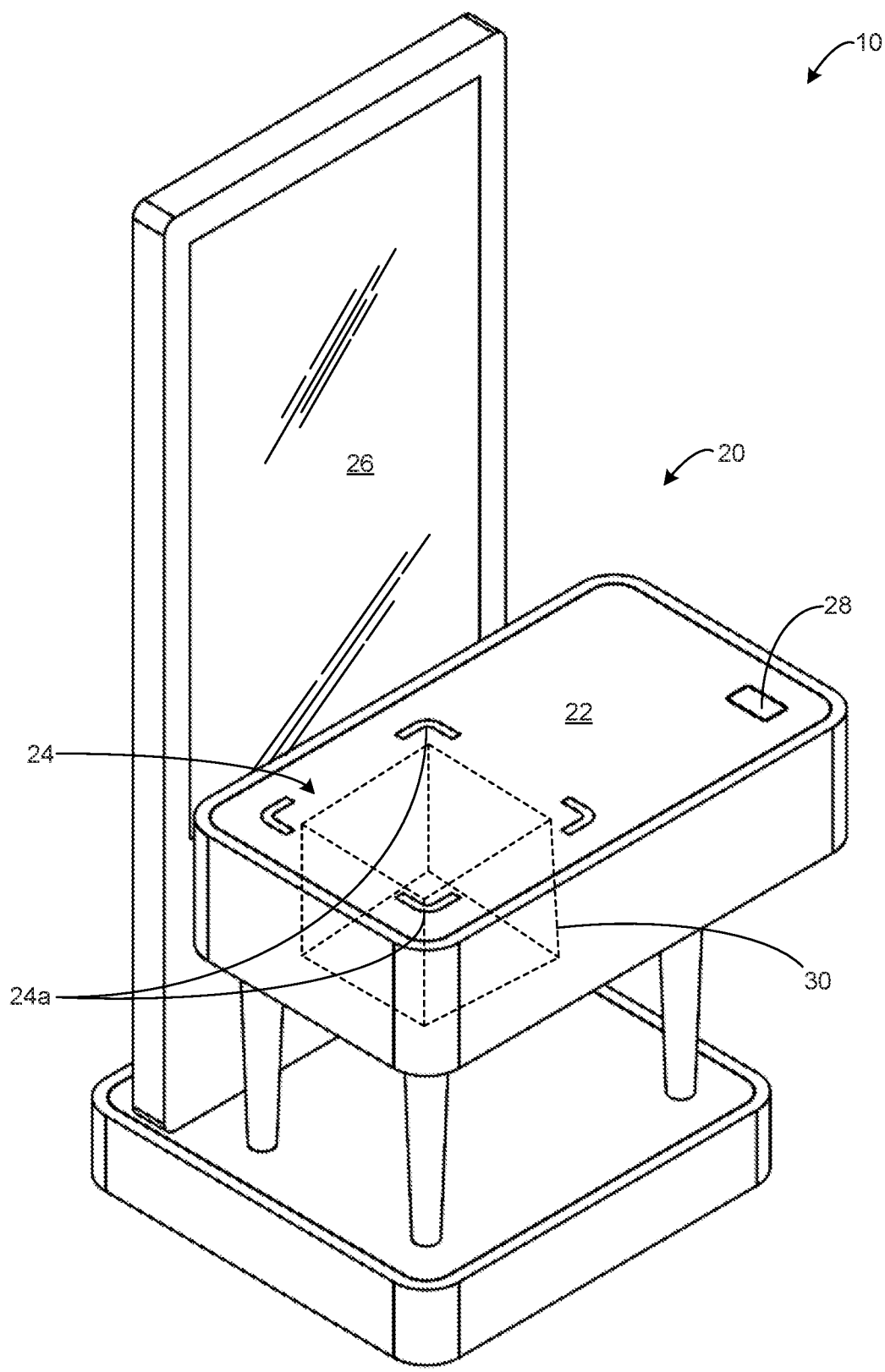
FIG. 1 is a perspective view of a Radio Frequency Identification (RFID) enabled self-checkout (SCO) station configured according to one embodiment of the present disclosure.

Turning now to the drawings, FIG. 1 illustrates a perspective view of an RFID-enabled SCO station 10 (hereinafter, referred to as "SCO station 10") configured according to one embodiment of the present disclosure. As seen in FIG. 1, SCO station 10 comprises a generally sealed enclosure 20 having a surface 22, a "scan zone" area 24, a display 26, a payment transaction region 28, and an RFID assembly 30 that includes, inter alia, an RFID antenna that emits RF interrogation signals through an adjustable aperture in an aperture plate and into the scan zone area 24.

In this embodiment, enclosure 20 comprises an enclosed table or cabinet, for example. Although not required, enclosure 20, which may be constructed from wood or metal, for example, is supported by multiple legs above an underlying raised platform resting on a supporting ground surface. In other embodiments, enclosure 20 may be supported by the legs that directly contact the ground surface. Regardless of the presence of an underlying support structure, however, the surface 22 of enclosure 20 is comprised of a material (e.g., tempered glass) that is pervious to the RF energy (also referred to herein as RF interrogation signals or RFID signals) emitted by the RFID antenna of RFID assembly 30.

The "scan zone" 24 is an area extending upwardly from surface 22. In this embodiment, a plurality of indicator markings 24a on surface 22 graphically indicate the boundaries of the scan zone 24 to a customer. The scan zone 24 is where the customer places the basket containing all the products he/she wants to purchase. Products for purchase are detected by the RFID assembly 30 as they enter the scan zone 24 and are added to a customer's "buy cart" (i.e., a list of products being purchased by the customer). Information identifying each product and its cost is displayed to the customer on display 26, as is the running sum total for all detected products. The RFID assembly 30 also detects products that are removed from the scan zone area 24. In these cases, the information identifying the products and their associated costs are removed from the display 26 as well as from the customer's buy cart and the running total. In any case, the customer can place a payment vehicle such as a smartphone, a credit card, or a debit card, for example, in the payment transaction region 28 to pay for the products in the customer's buy cart.

Conventionally, RFID-enabled SCO stations confine the radiation pattern of the RFID antenna used to trigger the RFID tags on the products with a wave guide enclosure having an aperture. The sidewalls of the wave guide enclosure prevent the side lobes emitted by the RFID antenna from interacting with RFID tags that are outside of the scan zone 24. The aperture, on the other hand, is a fixed-size opening or through-hole in the wave guide enclosure through which the emitted RF interrogation signals can pass. Usually, the aperture is positioned below the center of the scan zone 24 to allow the RF interrogation signals transmitted by the RFID antenna to enter the scan zone 24.

The size of the aperture defines the size of the radiation pattern of the RF interrogation signals transmitted by the RFID antenna, and as such, defines the size of scan zone 24 (i.e., the area in which the RFID tags on products can be triggered by the RF interrogation signals to send their information). Therefore, smaller apertures define smaller radiation patterns and smaller scan zones 24, while larger apertures define larger radiation patterns and lager scan zones 24. However, the fixed size of the apertures in conventional systems also fixes the sizes of both the radiation pattern emitted by the RFID antenna and the scan zone 24. That is, with conventional systems, the size of the scan zone 24 remains static and is not dynamically or selectively adjustable.

An RFID-enabled SCO station configured according to the present disclosure, however, is able to selectively and dynamically adjust the size of the aperture through which the RF interrogation signals transmitted by the RFID antenna pass, thereby increasing and decreasing the size of the corresponding scan zone 24. Decreasing the size of the aperture also decreases the size of the scan zone 24 to allow for normal checkout procedures. Increasing the size of the aperture, however, increases the size of the scan zone 24 thereby increasing the chance that any products a customer may try to hide from the RFID antenna are instead triggered by the RF interrogation signals. Moreover, the information read from the RFID tags of such "hidden" products is displayed on display 26 and added to the customer's buy cart.

Figure 2A:
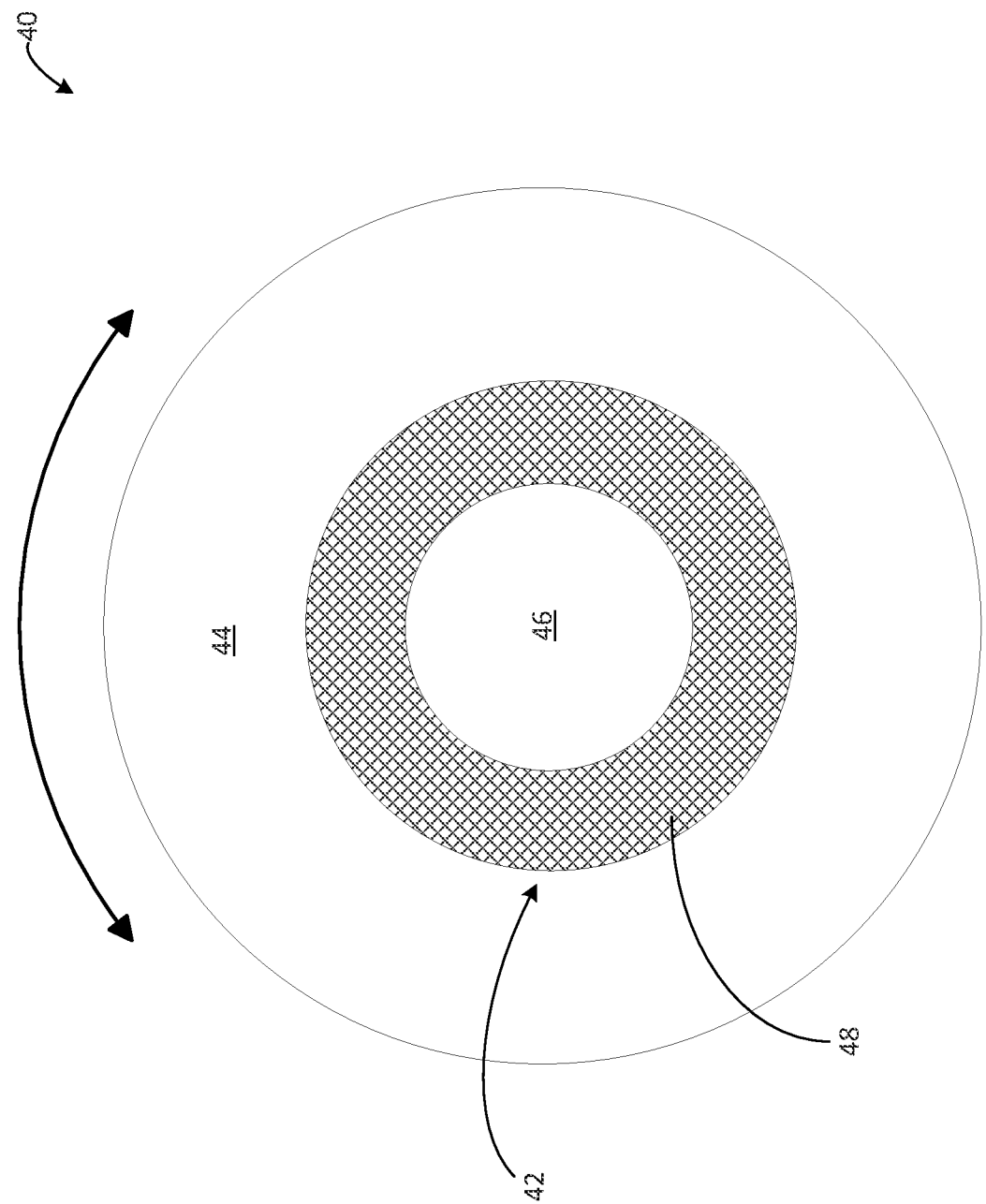
Figure 2B:
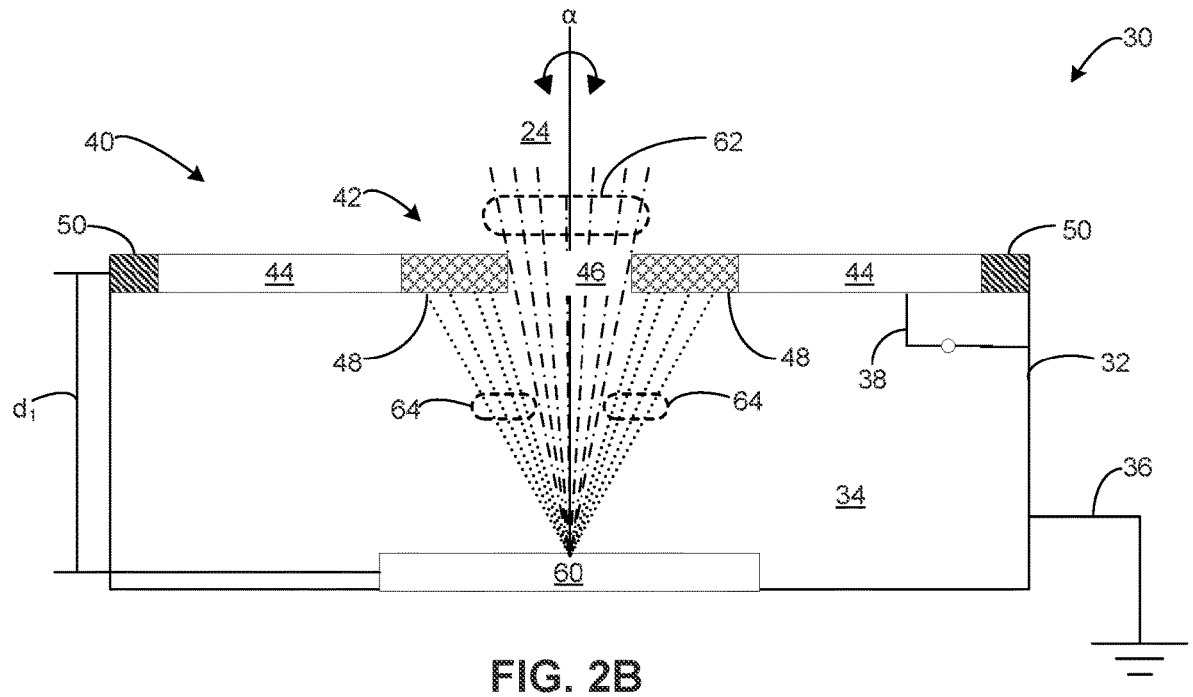
Figure 2C:
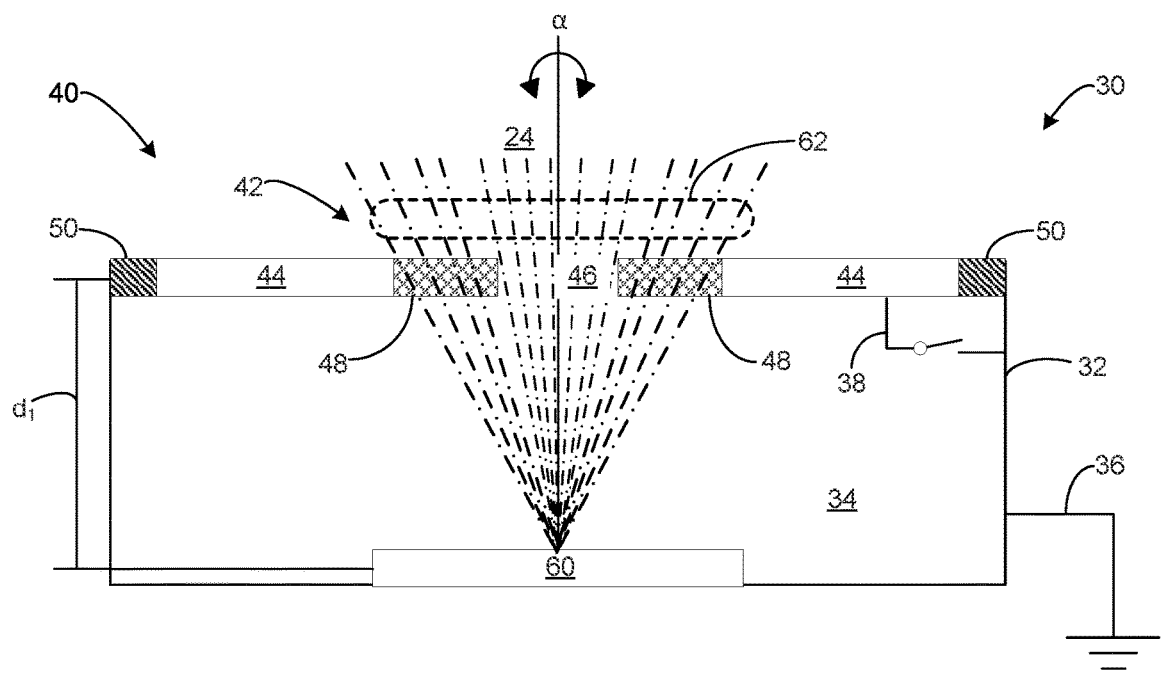

FIGS. 2A-2C illustrate the configuration and function of a RFID assembly 30 and its function in adjusting a scan zone 24 according to one embodiment of the present disclosure. As seen in FIG. 2A, the RFID assembly 30 comprises an aperture plate 40 having a variable aperture 42 and an outer portion 44 surrounding the outer periphery of the variable aperture 42. The aperture plate 40 functions as a waveguide to direct the RF energy emitted by the RFID antenna. Additionally, the variable aperture 42 comprises a central opening 46 and an RF shutter region 48 surrounding the outer periphery of the central opening 46. In this embodiment, aperture plate 40 is shaped as a disc; however, this is for illustrative purposes and ease of discussion only. Those of ordinary skill in the art will readily appreciate that aperture plate 40 may be any shape needed or desired.

According to the present disclosure, aperture plate 40 is manufactured from an electrically conductive material, such as a metal or metal alloy. In one embodiment, the outer portion 44 of aperture plate 40 is connected to a ground circuit, thereby configuring the aperture plate 40 to be substantially impervious to RF interrogation signals transmitted by an RFID antenna. That is, aperture plate 40, when grounded, prevents the transmitted RF interrogation signals from passing through both the outer portion 44 and RF shutter region 48 of aperture plate 40 and into scan zone 24. The central opening 46, in contrast, is a through-hole or opening that is pervious to the transmitted RF interrogation signals, and thus, RF interrogation signals always pass through the central opening 46 and into scan zone 24 regardless of whether any part of aperture plate 40 is grounded.

The RF shutter region 48 surrounding the central opening 46 is constructed from the same material that comprises the outer portion 44. According to the present disclosure, the RF shutter region 48 can be selectively controlled to be pervious and impervious to the RF interrogation signals being transmitted by the RFID antenna. For example, in one embodiment, the outer portion 44 of aperture plate 40 is alternately electrically connected to, and electrically isolated from, the ground circuit. When the outer portion 44 of aperture plate 40 is electrically connected to the ground circuit, the RF interrogation signals transmitted by the RFID antenna pass through the central opening 46 but are prevented from passing through both the outer portion 44 and the RF shutter region 48 of aperture plate 40. This electrical connection to ground, therefore, effectively decreases/constrains the radiation pattern of the transmitted RF interrogation signals, and as such, decreases/constrains the size of the scan zone 24 to be substantially the same size as the area bounded by the indicators 24a on surface 22.

When the outer portion 44 of aperture plate 40 is electrically isolated from the ground circuit, the transmitted RF interrogation signals are permitted to pass through the both central opening 46 and RF shutter region 48. Thus, the electrical isolation from ground effectively increases the size of the scan zone 24 to essentially be that of an unimpeded radiation pattern of the antenna. Therefore, according to the present disclosure, the effective size of the variable aperture 42, and thus, the effective size of the scan zone 24, is increased and decreased by selectively and dynamically connecting the aperture plate 40 to, and isolating the aperture plate 40 from, a ground circuit.

Those of ordinary skill in the art will readily appreciate that aperture plate 40 may have different structures. For example, in one embodiment, aperture plate 40 is constructed so that the RF shutter region 48 and the outer portion 44 are electrically isolated from each other by a non-conductive material (e.g., a plastic ring disposed between and concentric with outer portion 44 and RF shutter region 48). In this embodiment, the outer portion 44 would always be electrically connected to the ground circuit, thereby making the outer portion 44 impervious to transmitted RF interrogation signals, while the RF shutter region 48 would be selectively electrically connected to, and electrically disconnected from, the outer portion 44, thereby effectively connecting the RF shutter region 48 to, and isolating RF shutter region 48 from, the ground circuit.

FIGS. 2B-2D illustrate a cross-section of an RFID assembly 30 configured to function according to the present embodiments. As seen in these figures, RFID assembly 30 comprises a housing 32, the aperture plate 40, an RF antenna 60 configured to transmit the previously described RFID interrogation signals at a frequency of 433 MHz and/or 860-960 MHz, and one or more connecting components 50 that mechanically connect aperture plate 40 to housing 32. As described in more detail later, some embodiments of the present disclosure may configure components 50 to electrically connect and isolate aperture plate 40 to and from housing 32. However, in the embodiments of FIGS. 2B-2C, components 50 are non-conductive and thereby electrically isolate aperture plate 40 from ground circuit 36.

In this embodiment, the aperture plate 40 is separated from the RFID antenna 60 by a distance $d_1$ of $\frac{1}{4} \times \lambda \times (2 \times n - 1)$, wherein, as seen in FIG. 2D, for example:

λ is the speed of light c divided by the frequency f at which RFID antenna 60 transmits the RF interrogation signals (i.e., $\lambda = c/f$); and n is an integer $\geq 1$ and defines the number of wavelengths used in the configuration of RFID assembly 30 of SCO station 10.

Additionally, the diameter a of the aperture 46, in this embodiment, is greater than ¼ λ.

The distance $d_1$ is measured between a center portion of aperture plate 40 and a center portion of RFID antenna 60. In one embodiment, $d_1$ is equal to $\lambda(n+1)$, and thus, as seen in FIG. 2D, a peak of a sine wave representing the transmitted RF interrogation signals intersects aperture 46. Additionally, housing 32 forms an enclosed cavity 34 and is electrically connected to a ground circuit 36. The RFID antenna 60 is disposed within the cavity 34 and transmits the RF interrogation signals as previously described.

The sidewalls of housing 32 are constructed of a material that prevents RF interrogation signals transmitted by the RFID antenna 60 from exiting the sides and bottom of RFID assembly 30. For example, in one embodiment, the sidewalls of housing 32 are constructed from the same or similar metal or metal alloy used to construct aperture plate 40. An electrical switch, shown here in the abstract as switch 38, can be selectively closed and opened to alternately connect and disconnect (i.e., isolate) the aperture plate 40 to and from the ground circuit 36. In one embodiment, ground circuit 36 is shared with/electrically connected to, the circuit used to ground RFID antenna 60.

As seen in FIGS. 2B and 2C, RFID antenna 60 transmits signals, such as the RF interrogation signals previously described, into scan zone 24. In FIG. 2B, the electrical switch 38 is in a closed position electrically connecting the aperture plate 40 to housing 32 and ground circuit 36. When switch 38 is in the closed position, the RF interrogation signals transmitted by RFID antenna 60 (i.e., RFID signals 62) pass through central opening 46 and into scan zone 24, thereby allowing customers to scan their products during checkout. However, because switch 38 is closed, some of the transmitted RF interrogation signals (i.e., RFID signals 64) are blocked by outer portion 44 and RF shutter region 48 from passing through aperture plate 40 and into scan zone 24. Thus, electrically connecting aperture plate 40 to the ground circuit 36 effectively decreases the size of the variable aperture 42, thereby constraining the radiation pattern of the transmitted RF interrogation signals, and as such, the size of scan zone 24.

In FIG. 2C, however, switch 38 is opened to electrically isolate aperture plate 40 from ground circuit 36. When switch 38 is in the open position, the RF shutter region 48 (as well as outer portion 44) is pervious to the RF interrogation signals transmitted by RFID antenna 60. Thus, the transmitted RF interrogation signals pass through both the central opening 46 and RF shutter region 48 into scan zone 24, thereby increasing the size of both the variable aperture 42 and scan zone 24. The sidewalls of housing 32, however, continue to block or prevent the transmitted RF interrogation signals from exiting the RF assembly 30 through the sidewalls.

Increasing and decreasing the effective size of the scan zone 24 by electrically connecting and disconnecting aperture plate 40 to and from ground circuit 36 provides benefits that conventional SCO systems cannot provide. For example, as stated above, an SCO station 10 configured according to the present embodiments enhances security and helps prevent fraud by customers. Consider, for example, a customer who does not want to pay for a given article of clothing. In these situations, the customer may try to wear the article of clothing while checking out at SCO station 10 rather than place the article of clothing into the scan zone 24. Because the scan zones 24 of conventional SCO systems are static, and because conventional aperture plates 40 do not have variable apertures 42, the radiation pattern of the transmitted RF interrogation signals is also constrained. Thus, the RF interrogation signals entering the scan zone 24 may not trigger the RFID tags attached to the clothing. However, electrically isolating aperture plate 40 from ground circuit 36 increases the size of the radiation pattern of the transmitted RF interrogation signals by allowing the transmitted RF interrogation signals to pass through a larger area of aperture plate 40 (i.e., the variable aperture 42). This increases the effective size of the scan zone 24 thereby allowing the transmitted RFID signals 62 to trigger the RFID tags of products that are not directly in scan zone 24, but rather, are proximate scan zone 24. In one embodiment, electrically isolating the aperture plate 40 from the ground circuit 36 increases the area of scan zone 24 such that RFID tags on a product can be triggered at a distance of about three (3) feet away from the sides of enclosure 20.

Those of ordinary skill in the art should appreciate that the size of aperture 46 and RF shutter region 48 can be any size needed or desired. In one embodiment, however, aperture 46 is 4-inches in diameter and RF shutter region 48 is 5.5-inches in diameter. When aperture plate 40, and thus, RF shutter region 48, is electrically grounded to ground circuit 36, the 4-inch diameter aperture 46 limits the size of the RFID antenna field such that only the RFID tags attached to products in a buy zone are triggered. However, when the RF shutter region 48 is electrically isolated from ground circuit 36, the effective size of aperture 46 is increased to 5.5-inches in diameter such that the transmitted RF interrogation signals of RFID antenna field trigger the RFID tags of products that are up to 3-feet outside of the buy zone.

According to the present embodiments, there are a variety of ways that the aperture plate 40 can be selectively and dynamically connected to, and isolated from, the ground circuit 36. As stated above, for example, one embodiment utilizes an electrical switch 38 that closes and opens to electrically connect aperture plate 40 to, and isolate aperture plate 40 from, ground circuit 36. In these cases, the one or more connecting components 50 may support aperture plate 40 relative to housing 32, but also electrically isolate aperture plate 40 from housing 32 and ground circuit 36.

In another embodiment, aperture plate 40 is rotated about an axis α into and out of an electrical connection with ground circuit 36 by a motor, for example. The motor (seen later in FIG. 9) may be selectively and dynamically controlled to rotate aperture plate 40 about axis α such that one or more electrical contacts disposed on a surface of aperture plate 40 move into and out of contact with one or more corresponding electrical contacts connected to housing 32 and ground circuit 36. The corresponding electrical contacts, for example, may be comprised in the one or more connecting components 50. In such cases, the one or more connecting components 50 would still support aperture plate 40 relative to housing 32 but would also be configured to alternately connect aperture plate 40 to, and isolate aperture plate 40 from, ground circuit 36 depending on the rotation of aperture plate 40. More specifically, the one or more connecting components 50 would electrically connect aperture plate 40 to housing 32 when the motor rotates electrical contacts on aperture plate 40 into contact with the corresponding electrical contacts in the one or more connecting components 50. To electrically isolate aperture plate 40 from housing 32, the motor would rotate aperture plate 40 such that the electrical contacts on aperture plate 40 move out of contact with the corresponding electrical contacts in the one or more connecting components 50.

There are also a variety of ways in which to control the connection of aperture plate 40 to, and isolation of aperture plate 40 from, ground circuit 36. For example, in one embodiment, the connection and disconnection of aperture plate 40 is controlled by a timer. In this embodiment, SCO station 10 is configured to enter a "buy mode" of operation when a customer initiates checkout (e.g., when the customer places a container comprising his/her selected products in scan zone 24 on the surface 22 of enclosure 20). In the buy mode, RFID antenna 60 emits RF interrogation signals to trigger the RFID tags attached to the selected products, as previously described. Additionally, aperture plate 40 would be actively configured to electrically connect to ground circuit 36 (e.g., using switch 38 or by rotating aperture plate 40). So configured, the RF interrogation signals transmitted by RFID antenna 60 (e.g., RFID signals 62 of FIG. 2B) pass through the central opening 46 and into scan zone 24. However, the electrical connection also causes the RF shutter region 48 of variable aperture 42 to become substantially impervious to the RF interrogation signals, thereby preventing the RF interrogation signals transmitted by RFID antenna 60 (e.g., RFID signals 64 of FIG. 2B) from entering the scan zone 24. Thus, in the buy mode of operation, the radiation pattern of the transmitted RF interrogation signals is confined by the central opening 46, which limits the size of scan zone 24 to an area substantially defined by the indicators 24a on surface 22 of enclosure 20.

When the timer expires, however, SCO station 10 is configured to automatically enter an "audit mode" of operation. In the audit mode, RFID antenna 60 would still emit the RF interrogation signals, but aperture plate 40 would be actively isolated from ground circuit 36 (e.g., via switch 38 or by rotating aperture plate 40). Isolating aperture plate 40 from ground circuit 36 causes the RF shutter region 48 of variable aperture 42 to become substantially pervious to the RF interrogation signals. This allows the RF interrogation signals transmitted by RFID antenna 60 to pass through both the central opening 46 and the RF shutter region 48 (e.g., RFID signals 62 of FIG. 2C), thereby increasing the size of the radiation pattern of transmitted RF interrogation signals. This, in turn, increases the size of scan zone 24 to allow the RF interrogation signals transmitted by RFID antenna 60 to trigger the RFID tags associated with products positioned outside of the scan zone 24 when in the buy mode. When the audit mode is complete, which may be dictated by another timer, for example, SCO station 10 would re-enter the buy mode of operation by electrically connecting aperture plate 40 to ground circuit 36, as previously described.

Thus, the timer(s) of this embodiment configure the aperture plate 40 such that the size of scan zone 24 is selectively and dynamically increased and decreased. However, the present disclosure is not limited solely the use of timers to control the electrical connection and isolation of aperture plate 40 to ground circuit 36. In another embodiment, for example, SCO station 10 is configured to selectively switch between operational modes responsive to detecting one or more predetermined events. By way of example only, SCO station 10 is configured with one or more proximity sensors to detect when customers approach SCO station 10. Responsive to detecting a customer, SCO station 10 automatically enters the buy mode of operation by electrically connecting aperture plate 40 to ground circuit 36. In this mode, as stated above, the customer can place his/her container into scan zone 24 so that the products in the container can be identified. Then, responsive to detecting a subsequent, different predetermined event (e.g., detecting that the RFID tags of all the products in the container have been read and/or that the customer will now pay for the products), SCO station 10 automatically enters the audit mode of operation by electrically isolating aperture plate 40 from ground circuit 36. This increases the size of scan zone 24 such that the RFID tags of products positioned outside of the scan zone 24 defined in the buy mode of operation are triggered to send their information to SCO station 10. Upon receiving the information, SCO station 10 updates display 26 to show the customer the detected product(s) as well as provide the customer with an updated cost.

In another embodiment, SCO station 10 is configured to automatically enter the audit mode of operation upon detecting the presence of a customer, and thereafter, automatically enter the buy mode of operation (e.g., after the expiration of a timer or responsive to detecting the customer placing a container of products on surface 22 of enclosure 20). In such embodiments, it is possible that SCO station 10 will detect one or more products in the customer's container prior to the customer placing the container onto the surface 22 of enclosure 20. Therefore, SCO station 10 is configured to automatically resolve the information received from the RFID tags in both the audit mode and the buy mode to eliminate charging the customer for the same product twice. In other embodiments, SCO station 10 is configured to intermittently switch its mode of operation between the buy mode and the audit mode. In these embodiments, the time spent in the buy mode and/or the audit mode may be defined by one or more timers, for example.

The previous embodiment illustrates SCO station 10 in the context of a single aperture plate 40. However, those of ordinary skill in the art should readily understand that the present disclosure is not so limited. Rather, SCO station 10 may be configured to selectively and dynamically increase and decrease the size of scan zone 24 using multiple aperture plates.

Figure 3B:
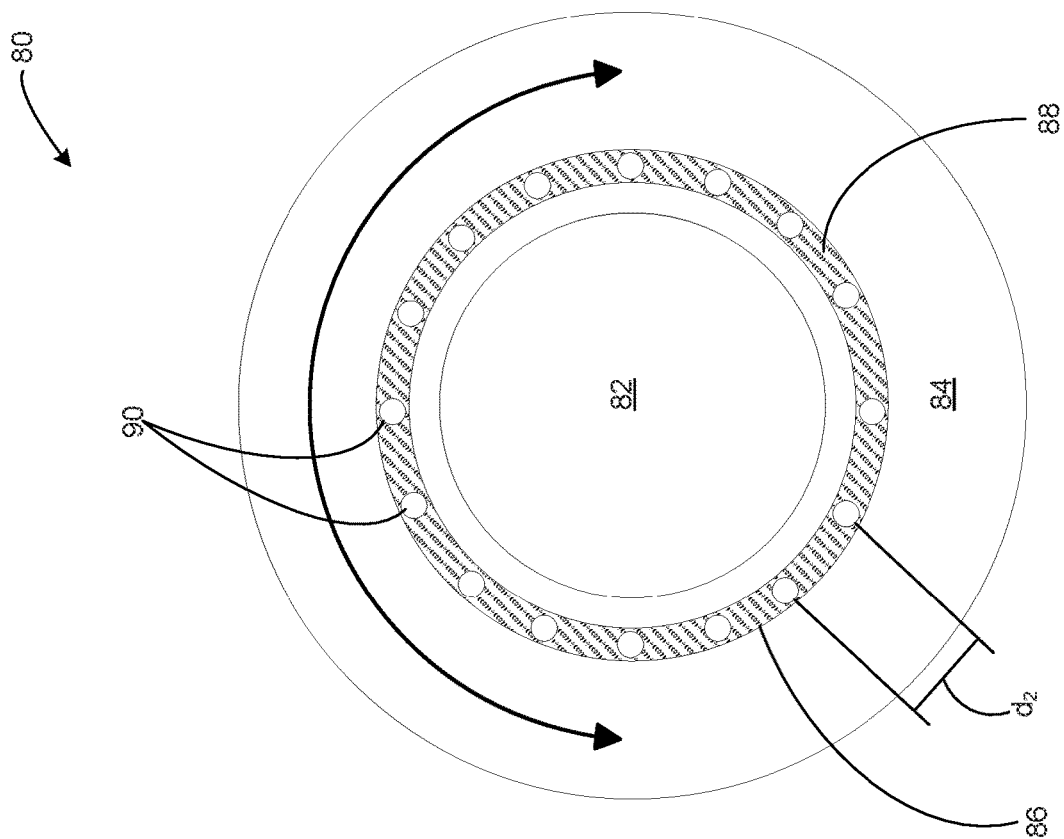
FIGS. 3A-3B illustrate multiple aperture plates configured according to one embodiment of the present disclosure.
Figure 3A:
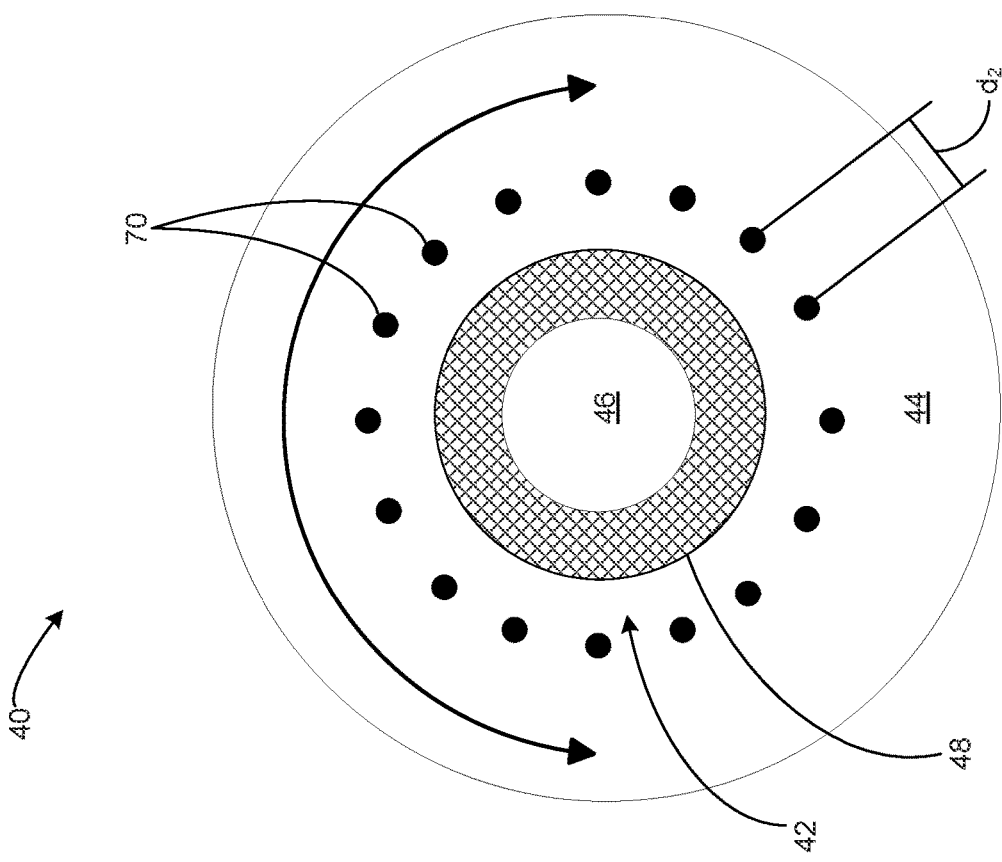

FIGS. 3A-3B, for example, illustrate an embodiment in which the RFID assembly 30 of SCO station 10 comprises first and second aperture plates 40, 80. As seen in FIG. 3A, the structure of the first aperture plate 40 is the same as described in the previous embodiment. Thus, the first aperture plate 40 comprises variable aperture 42 having a central opening 46 and an RF shutter region 48, as well as outer portion 44. In addition, however, the first aperture plate 40 also comprises one or more electrically conductive raised grounding elements 70 disposed on aperture plate 40 concentrically about variable aperture 42. In this embodiment, raised grounding elements 70 are formed as bumps that are electrically connected to, and extend outwardly from, the surface of first aperture plate 40. In other embodiments, however, grounding elements 70 may comprise balls, spring contacts, or any other conductive object configured to facilitate the electrical connection and electrical isolation of the first aperture plate 40 to and from a ground circuit, as previously described.

In this embodiment, grounding elements 70 are spaced apart by a distance $d_2$, which is equivalent to ¼ λ. Particularly, the topology of electrical shorts or "grounds" (i.e., the grounding elements 70) and "opens" (i.e., the spaces between the grounding elements 70) determine whether the aperture plate 40 will support or deter a standing SIN wave from forming between the first and second aperture plates 40, 80. In this embodiment, the grounding elements 70 are arranged on aperture plate 40 at every ¼ λ interval. As described in more detail below, this configuration allows grounding elements 70 to electrically contact the second aperture plate 80 at ¼ λ intervals. Moving aperture plates 40, 80 relative to each other, however, repositions the grounding elements 70 to misalign them with through-holes 90 (seen in FIG. 3B). In this position, the grounding elements 70 are prevented from electrically contacting aperture plate 80.

The second aperture plate 80, as seen in FIG. 3B, also comprises a central opening 82 and an outer portion 84. The diameter of the central opening 82 is larger than the diameter of the central opening 46 of the first aperture plate 40. However, in this embodiment, the second aperture plate 80 also comprises an insulator 86 having a plurality of through-holes 90 formed in its surface 88. The insulator 86 is comprised of a non-conductive material, such as plastic. The through-holes 90 are spaced-away from the peripheral edge of central opening 82 by a distance of ¼ λ. Additionally, the through-holes 90 are also spaced-apart by a distance $d_2$ of $n \times ¼$ λ (wherein n is an even integer ≥2) so as to match the arrangement of the raised grounding elements 70 of first aperture plate 40.

In this embodiment, the spaces on surface 88 between the through-holes 90 correspond to the previously described "opens" and are arranged at the odd ¼ λ intervals (i.e., at intervals of $(n-1) \times ¼$ λ, where n is an even integer ≥2). Thus, when the grounding members 70 are aligned with through-holes 90, they are positioned at even ¼ wavelengths and extend through the through-holes 90 to electrically contact the second aperture plate 80. In this position, a standing SIN wave is supported thereby allowing the transmitted RF energy to travel freely. Moving aperture plates 40, 80 relative to each other, however, moves the grounding elements 70 out of the through-holes 90 and into the odd ¼ wavelength positions between the through-holes 90. In this position, the grounding elements 70 are prevented from electrically contacting second aperture plate 80, thereby deterring the formation of a supporting standing SIN wave and attenuating the transmitted RF energy.

In other words, the first aperture plate 40 is substantially impervious to the transmitted RF interrogation signals when grounding elements 70 are aligned with the through-holes 90 and electrically contact the second aperture plate 80, which is electrically grounded. Such alignment causes the first aperture plate 40 to interfere with the transmitted RF interrogation signals from antenna 60, thereby confining the transmitted RF interrogation signals to smaller lobes, which results in a decreased size of scan zone 24. However, when grounding elements 70 are not aligned with the through-holes 90 (i.e., are repositioned to contact the open spaces between through-holes 90), they contact the surface 88 of isolator 86 and are electrically isolated from the second aperture plate 80. In this position, the first aperture plate 40 becomes substantially pervious to the transmitted RF interrogation signals, and the RF interrogation signals transmitted by antenna 60 form larger lobes, which results in an increased size of scan zone 24.

Thus, the arrangement of the grounding elements 70 and through-holes 90 as described herein selectively and dynamically supports or deters an unintended standing wave from forming between the plates 40 and 80, thereby selectively and dynamically modifying the effective size of scan zone 24.

Figure 4A:
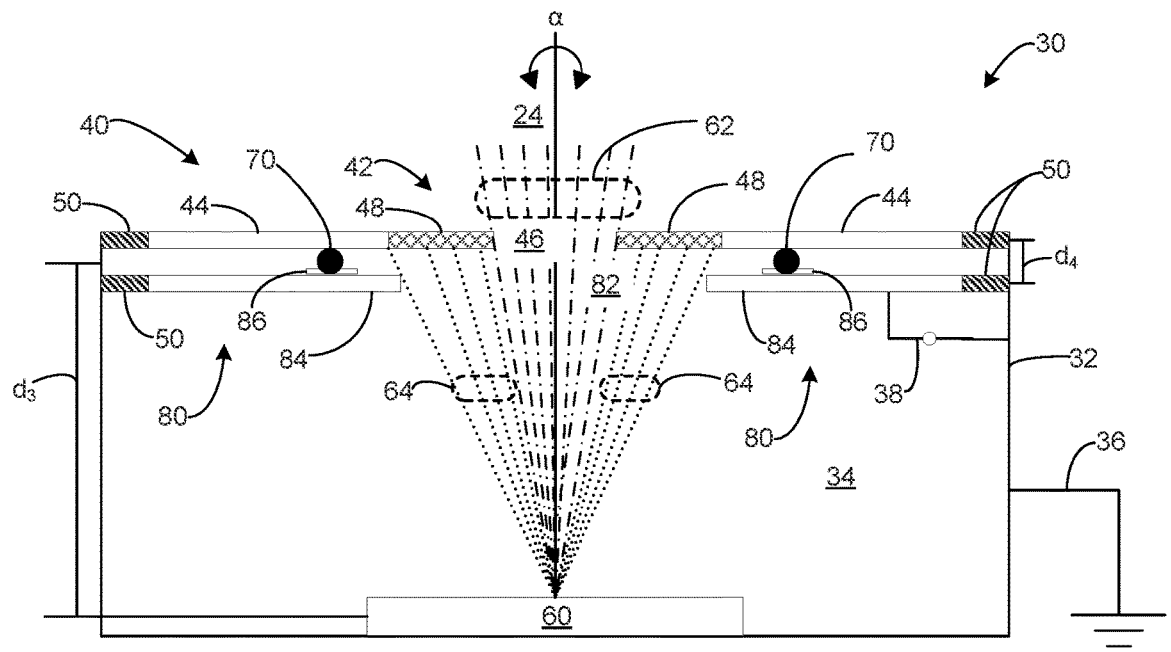
FIGS. 4A-4B illustrate a function of the aperture plates illustrated in FIGS. 3A-3B in adjusting a scan zone area according to one embodiment of the present disclosure.
Figure 4B:
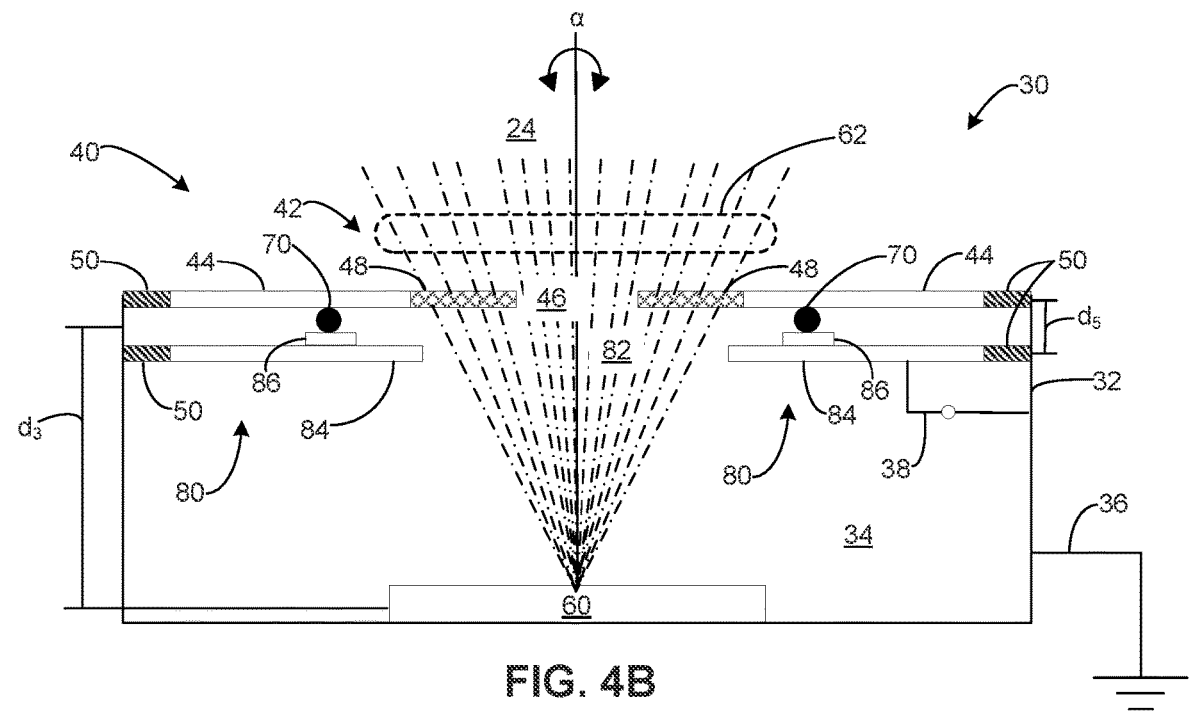

FIGS. 4A-4B illustrate the operation of RFID assembly 30 comprising first and second aperture plates 40, 80 according to one embodiment of the present disclosure. As seen in these figures, the central openings 46, 82 of the first and second aperture plates 40, 80 are vertically aligned on axis α with the first aperture plate 40 being disposed "above" the second aperture plate 80. Both aperture plates 40, 80 are supported relative to the housing 32 and each other by one or more connecting components 50. The distance $d_3$ between aperture plates 40, 80 and RFID antenna 60 is equivalent to an odd ¼ λ interval (i.e., $(n-1) \times ¼$ λ, where n is an integer ≥2), and is measured from the center line between the two plates to the center of the RFID antenna 60.

As seen in FIG. 4A, RF assembly 30, and thus, SCO station 10, is configured to operate in the buy mode. In the buy mode, the effective size of the variable aperture 42 in first aperture plate 40 is decreased such that the RFID signals 62 entering the scan zone 24 are those that pass through central openings 46, 82. Particularly, the second aperture plate 80 is electrically connected to ground circuit 36 via one or more switches or other electrical connections, represented abstractly in this embodiment as switch 38. In one embodiment, the switches 38 or other electrical connections are disposed in component 50, thereby electrically connecting second aperture plate 80 at its outer periphery to ground circuit 36. To electrically connect the first aperture plate 40 to ground circuit 36, one embodiment of the present disclosure rotates the first aperture plate 40 about axis α such that each raised grounding element 70 sits or rests within a corresponding through-hole 90 formed in insulator 86. So positioned, the raised grounding elements 70, which are electrically connected to the first aperture plate 40, contact the surface of the second aperture plate 80, thereby electrically connecting the first aperture plate 40 to the second aperture plate 80 and ground circuit 36. As stated above, the electrical connection configures the RF shutter region 48 of first aperture plate 40 to substantially prevent at least some of the transmitted RF interrogation signals (i.e., RFID signals 64) from entering scan zone 24.

FIG. 4B illustrates RF assembly 30, and thus, SCO station 10, configured to operate in the audit mode. In this mode, the second aperture plate 80 remains electrically connected to ground circuit 36 but the first aperture plate 40 is electrically isolated from the second aperture plate 80 and ground circuit 36. To accomplish this, one embodiment of the present disclosure rotates the first aperture plate 40 about axis α such that each raised grounding element 70 is moved out of its corresponding through-hole 90, which may be beveled, and comes to rest on the surface 88 of insulator 86 between two through-holes 90. In this position, the first aperture plate 40 is electrically isolated from the second aperture plate 80 and ground circuit 36.

Electrically isolating the first aperture plate 40 from the second aperture plate 80 and ground circuit 36 effectively increases the size of the variable aperture 42 of first aperture plate 40 by causing the RF shutter region 48 to be pervious to the RF interrogation signals transmitted by RFID antenna 60. Thus, transmitted RFID signals 62 pass through both central openings 46, 82 and the RF shutter region 48, and enter scan zone 24. The effective size of the scan zone 24 is therefore increased such that the RFID signals 62 transmitted by RFID antenna 60 can trigger the RFID tags attached to products that lie outside of the scan zone 24 defined in the buy mode of FIG. 4A.

Additionally, as seen in FIGS. 4A-4B, rotating the first aperture plate 40 modifies the distance between the first and second aperture plates 40, 80. Particularly, when the first and second aperture plates 40, 80 are electrically connected to each other (FIG. 4A), the distance $d_4$ between the two plates is approximately 1-2% of the wavelength at which RFID antenna 60 transmits the RF interrogation signals. However, when the first and second aperture plates 40, 80 are electrically isolated from each other (FIG. 4B), distance $d_4$ is increased slightly to $d_5$ because the raised grounding elements 70 sit on the surface 88 of insulator 86 rather than extend through the through-holes 90. Accordingly, in at least one embodiment, the first and/or the second aperture plates 40, 80 are vertically displaceable. The vertical displacement can be any distance needed or desired. In this embodiment, however, the distance $d_5$ is equal to the sum of the depth of a grounding element 70 and the depth of insulator 86.

It should be noted here that while the use of components 50 with respect to aperture plate 80 is optional. When used, a means to electrically connect the aperture plate 80 to ground circuit, such as switch 38, is needed. However, in embodiments where components 50 are not used in connection with aperture plate 80, switch 38 is not needed. This is because aperture plate 80 can be electrically connected directly to the common antenna ground 36 via housing 32.

The embodiment of FIGS. 4A-4B illustrate rotating the first aperture plate 40 using a motor, for example, to alternately electrically connect and electrically isolate the first aperture plate 40 from ground circuit 36. However, those of ordinary skill in the art will readily appreciate that the present disclosure is not so limited. In another embodiment, for example, the motor rotates the second aperture plate 80 rather than the first aperture plate 40 to alternately electrically connect and electrically isolate the first aperture plate 40 from ground circuit 36. In yet another embodiment, the first and second aperture plates 40, 80 are rotated in different directions, while another embodiment rotates the insulator 86. In this latter embodiment, the first and second aperture plates 40, 80 remain stationary.

Figure 5A:
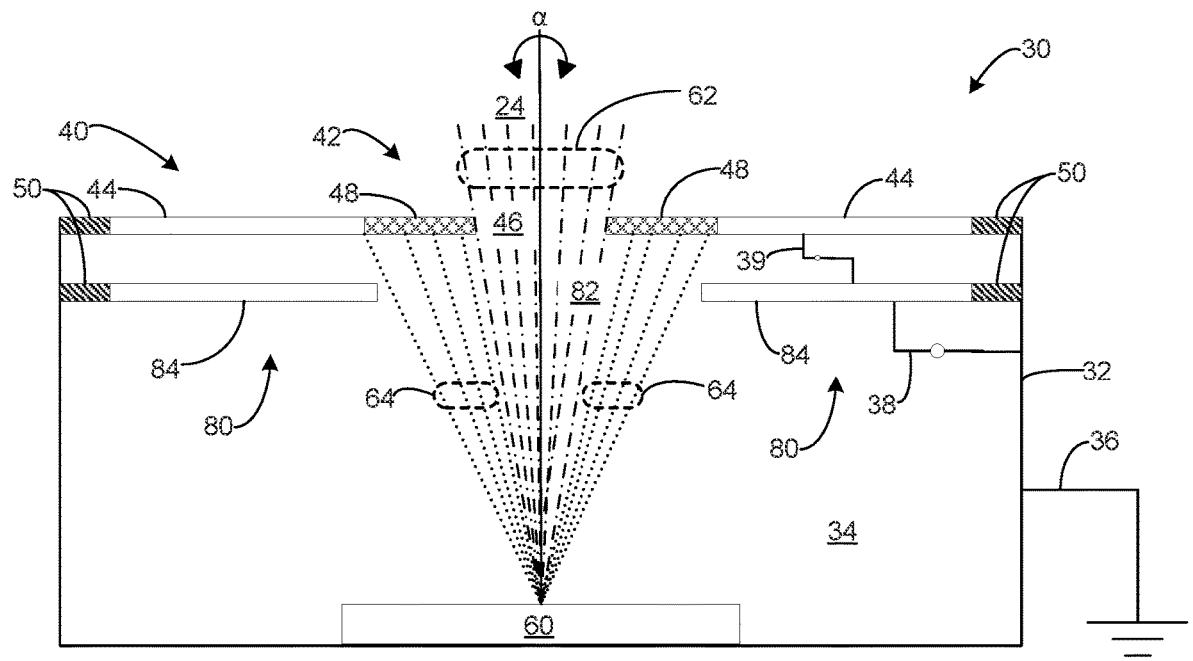
FIGS. 5A-5B illustrate a function of the aperture plates illustrated in FIGS. 3A-3B in adjusting a scan zone area according to another embodiment of the present disclosure.
Figure 5B:
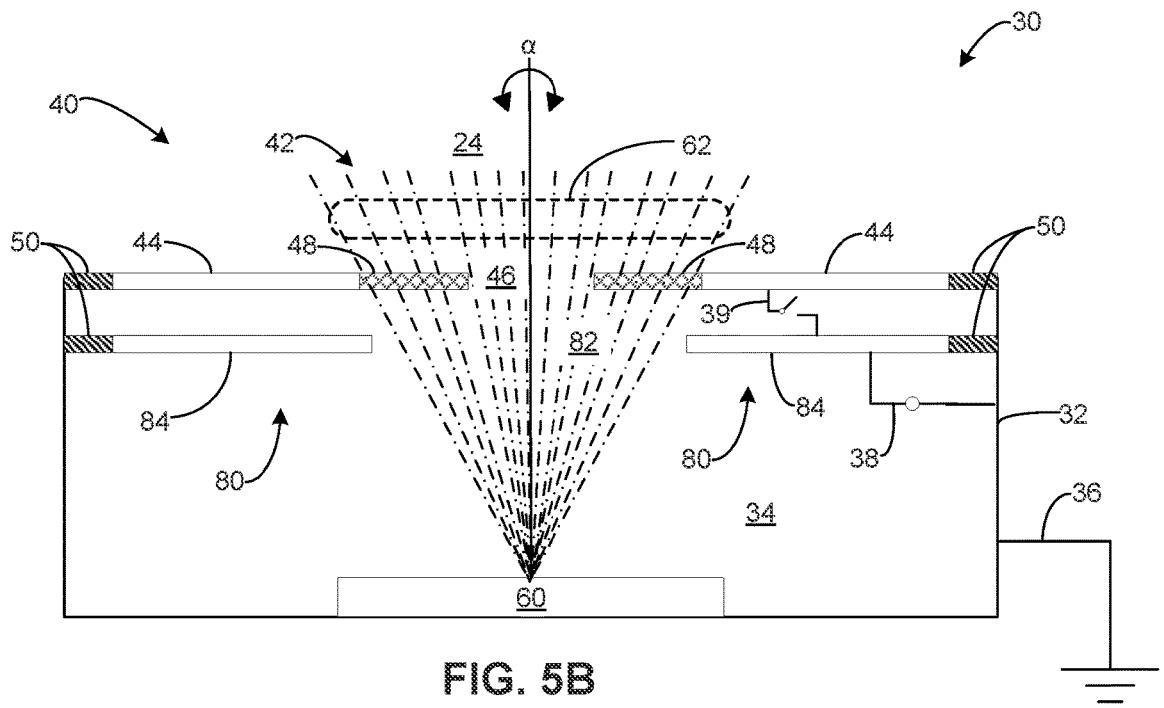

FIGS. 5A-5B illustrate how RF assembly 30 adjusts the effective size of scan zone 24 according to another embodiment of the present disclosure. As seen in FIGS. 5A and 5B, RF assembly 30 has the first and second aperture plates 40, 80 illustrated in FIGS. 3A-3B. Further, as described above, the second aperture plate 80 is electrically connected to ground circuit 36 via one or more switches or other electrical connections, also represented abstractly in this embodiment as switch 38. However, in this embodiment, there is no insulator 86 and neither aperture plate 40, 80 is movable or rotatable. Rather, the first aperture plate 40 is selectively electrically connected to the second aperture plate 80 and the ground circuit 36 via one or more other switches or electrical connections, represented abstractly in this embodiment as switch 39. By way of example only, the switches 39 or other electrical connections may be disposed in component 50, thereby electrically connecting the first aperture plate to the second aperture plate 80 and/or ground circuit 36. As above, opening and/or closing the switch to connect/isolate the first aperture plate 40 to/from the second aperture plate 80 and ground circuit 36 may be done based on one or more timers, the detection of a predetermined event, the sensed proximity of a customer to SCO station 10, intermittently, and the like.

Regardless, electrically connecting the first aperture plate 40 to the second aperture plate 80 and ground circuit 36 (FIG. 5A) decreases the effective size of the variable aperture 42 by causing the RF shutter region 48 to become impervious to the transmitted RF interrogation signals. This effectively decreases the size of the scan zone 24 (e.g., when operating in the buy mode). However, electrically isolating the first aperture plate 40 from the second aperture plate 80 and ground circuit 36 (FIG. 5B) increases the effective size of the variable aperture 42 by allowing the RF shutter region 48 to become pervious to the transmitted RF interrogation signals. This effectively increases the size of the scan zone 24 (e.g., when operating in the audit mode).

Those of ordinary skill in the art will appreciate that the use of component 50 with respect to aperture plate 80 in the embodiment of FIGS. 5A-5B is also optional. When component 50 is not present, aperture plate 80 simply connects to the ground circuit 36 via housing 32, as previously indicated.

Figure 6:
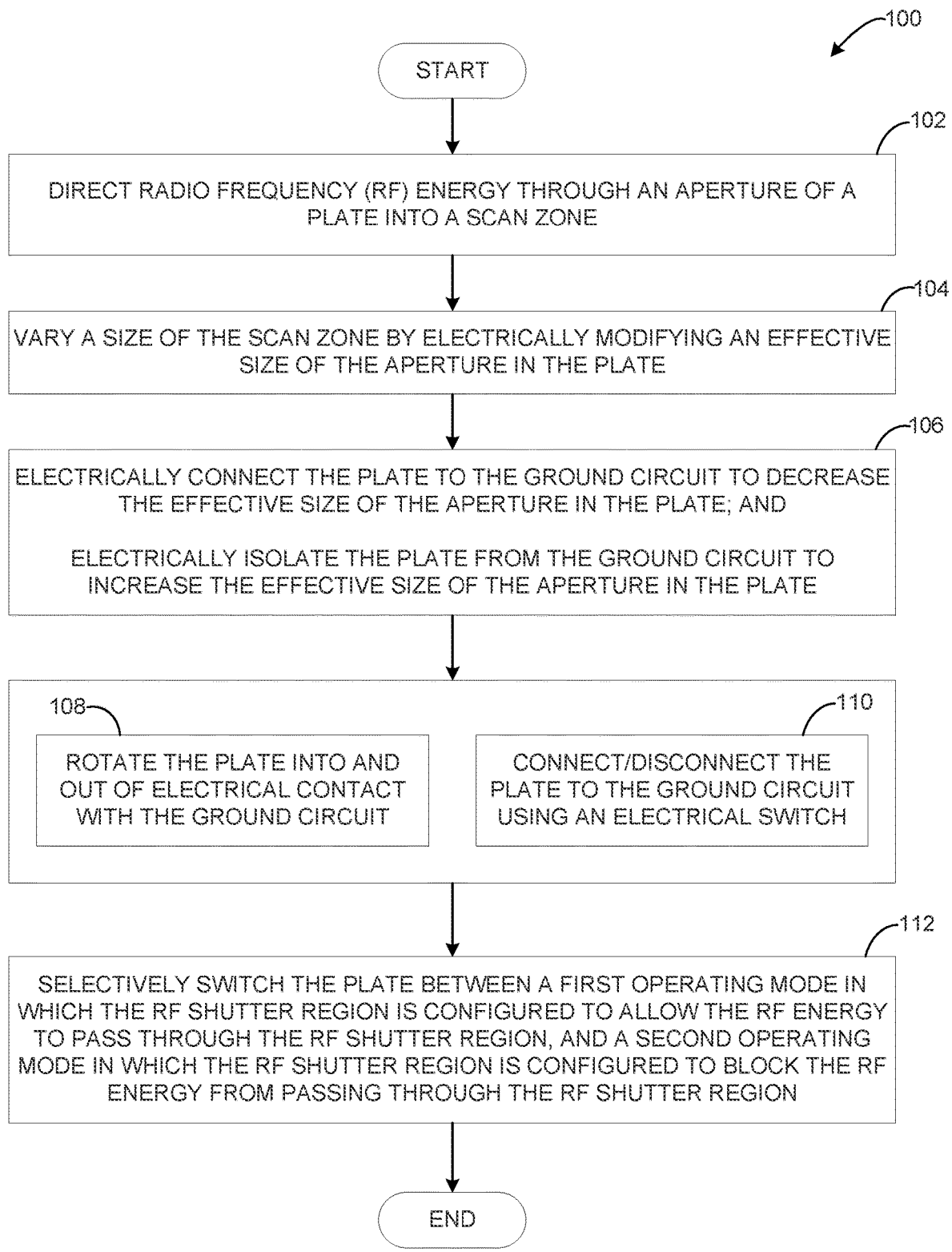
FIG. 6 is a flow diagram illustrating a method of adjusting a scan zone area according to one embodiment of the present disclosure.

FIG. 6 is a flow diagram illustrating a method 100 of adjusting scan zone 24 according to one embodiment of the present disclosure. As seen in FIG. 6, method 100 calls for directing RF energy (i.e., the RF interrogation signals transmitted by RFID antenna 60) through an aperture 42 of aperture plate 40 into scan zone 24 (box 102). So directed, method 100 varies the size of the scan zone 24 by electrically modifying the effective size of variable aperture 42 in aperture plate 40 (box 104).

In one embodiment, electrically modifying the effective size of variable aperture 42 in the aperture plate 40 comprises selectively electrically connecting aperture plate 40 to, and electrically isolating aperture plate 40 from, a ground circuit 36. Electrically connecting aperture plate 40 to the ground circuit 36 decreases the effective size of aperture 42 in aperture plate 40, while electrically isolating aperture plate 40 from ground circuit 36 increases the effective size of aperture 42 in aperture plate 40 (box 106).

As stated above, there are a variety of ways in which to electrically connect and isolate the aperture plate 40 to and from the ground circuit 36. In one embodiment, for example, method 100 calls for selectively rotating aperture plate 40 into and out of electrical contact with the ground circuit 36, as previously described (box 108). In another embodiment, method 100 calls for connecting and disconnecting aperture plate 40 from ground circuit 36 using one or more electrical switches or other electrical connections (box 110).

In another embodiment, method 100 calls for the aperture plate 40 to be operable in different operating modes. As described above, aperture plate 40 comprises an RF shutter region 48 surrounding a periphery of a central opening 46 in variable aperture 42. In at least one embodiment, electrically modifying the effective size of the variable aperture 42 comprises selectively switching the aperture plate 40 between a first operating mode (e.g., a buy mode) in which the RF shutter region 48 is configured to block the RF energy from passing through the RF shutter region 48, and a second operating mode (e.g., an audit mode) in which the RF shutter region 48 is configured to allow the RF energy to pass through the RF shutter region 48 (box 112). As previously described, selectively switching the aperture plate 40 into the first operating mode comprises electrically connecting the aperture plate 40 to ground circuit 36, while selectively switching the aperture plate 40 into the second operating mode comprises electrically isolating the aperture plate 40 from ground circuit 36.

Figure 7:
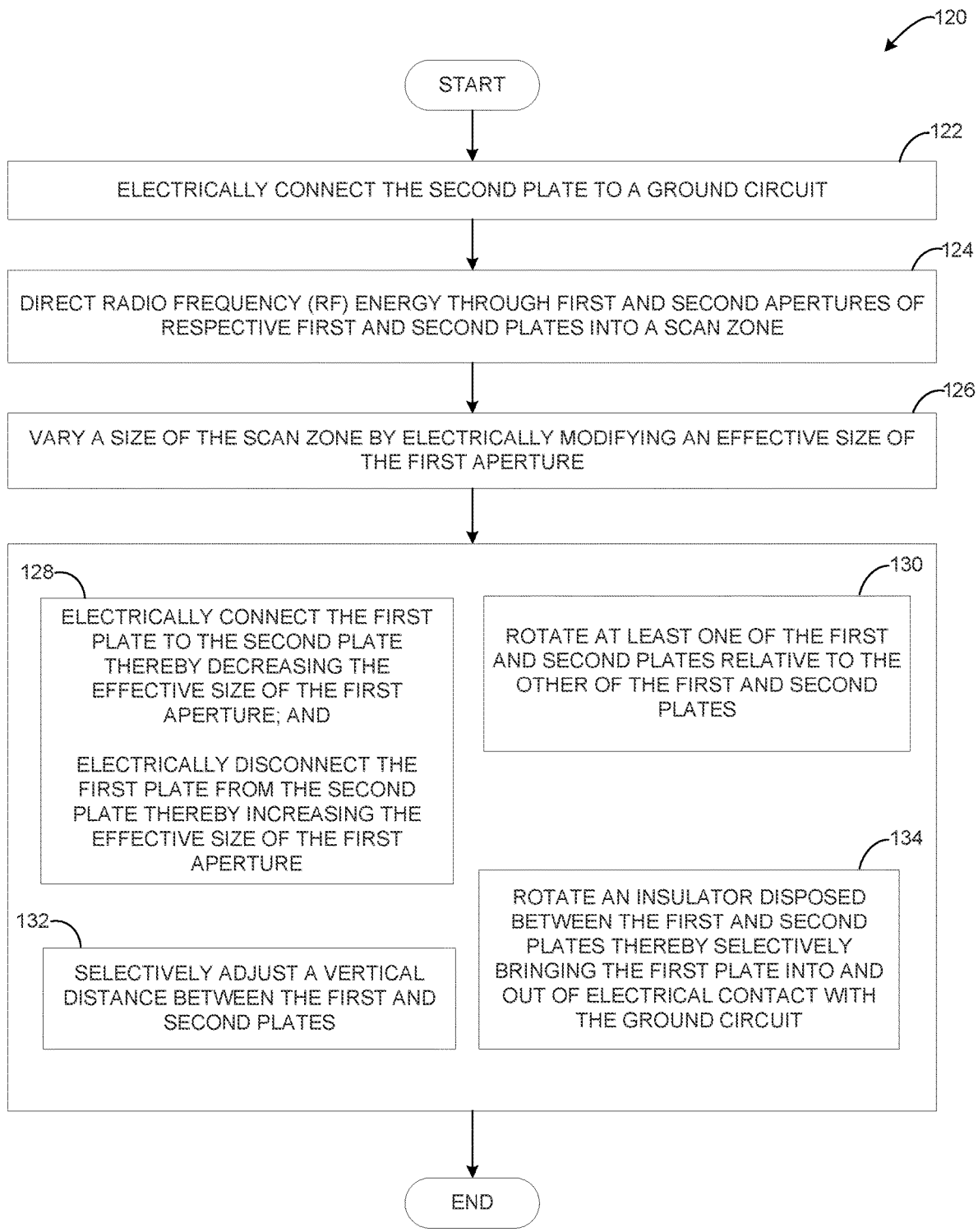
FIG. 7 is a flow diagram illustrating a method of adjusting a scan zone area according to another embodiment of the present disclosure.

FIG. 7 is a flow diagram illustrating a method 120 for adjusting a scan zone 24 according to another embodiment of the present disclosure. In this embodiment, first and second aperture plates 40, 80 are utilized to effectively modify (i.e., increase and decrease) the size of the scan zone 24. As previously described, the first aperture plate 40 comprises a variable aperture 42 having a central opening 46 and an RF shutter region 48 surrounding the periphery of the central opening 46. The second aperture plate 80 comprises a central opening 82 with a diameter that is larger than the diameter of central opening 46. Further, the central openings 46, 82 of the first and second aperture plates 40, 80 are vertically aligned along a longitudinal axis α.

As seen in FIG. 7, method 120 calls for the second aperture plate 80 to be electrically connected to ground circuit 36 (box 122). Method 120 also calls for directing RF energy, such as the RF interrogation signals, through the central openings 46, 82 of the first and second aperture plates 40, 80 and into the scan zone 24 (box 124). Method 120 then calls for varying the size of the scan zone 24 by electrically modifying the effective size of the variable aperture 42 in aperture plate 40 (box 126).

As previously described, there are a variety of ways to modify the variable aperture 42 of aperture plate 40. In one embodiment, method 120 calls for electrically connecting aperture plate 40 to aperture plate 80, thereby decreasing the effective size of variable aperture 42, and electrically isolating aperture plate 40 from aperture plate 80, thereby increasing the effective size of variable aperture 42 (box 128).

In another embodiment, method 120 calls for selectively rotating at least one of the aperture plates 40, 80 relative to the other of the aperture plates 40, 80 (box 130). Such rotation moves the aperture plate 40 into and out of electrical contact with aperture plate 80 and ground circuit 36, thereby increasing and decreasing the size of variable aperture 42 and scan zone 24.

In other embodiments, method 120 calls for selectively adjusting a vertical distance between aperture plates 40, 80 (box 132), and/or rotating an insulator 86 disposed between the aperture plates 40, 80, thereby selectively bringing aperture plate 40 into and out of electrical contact with aperture plate 80 and ground circuit 36 (box 134).

Figure 8:
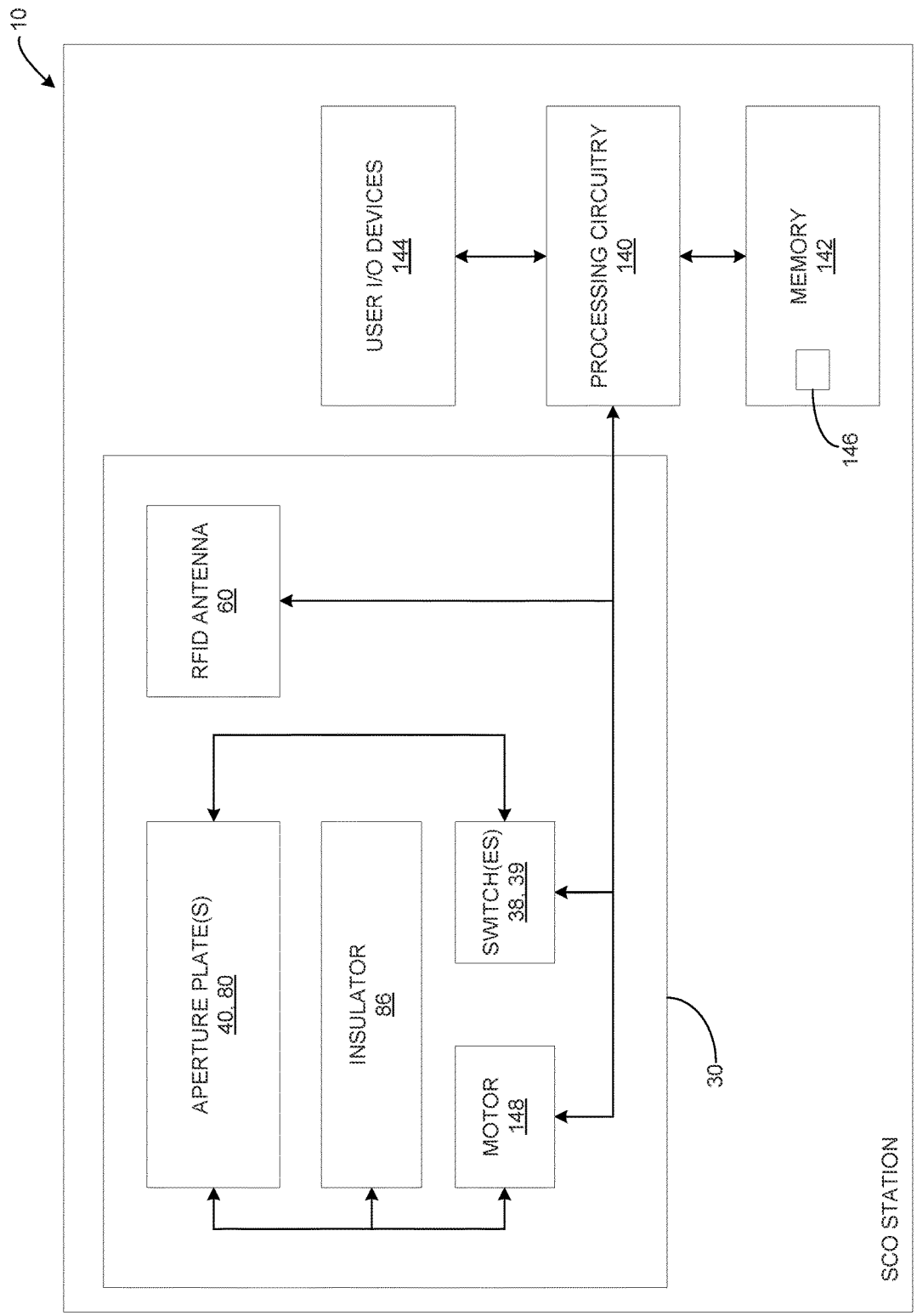
FIG. 8 is a block diagram illustrating some components of a RFID-enabled SCO station configured according to embodiments of the present disclosure.

FIG. 8 is a block diagram illustrating some components of a RFID-enabled SCO station 10 configured to function according to embodiments of the present disclosure. As seen in FIG. 8, SCO station 10 comprises processing circuitry 140, memory 142, a user Input/Output (I/O) interface 144, and the RFID assembly 30. The memory 142 also stores a control program 146 that, as described in more detail later, comprises instructions that, when executed by processing circuitry 140, control the operation of the RFID assembly 30 and SCO station 10, as previously described.

Processing circuitry 140, which in some embodiments may comprise a plurality of separate processor circuits, may comprise any sequential state machine operative to execute machine instructions stored as machine-readable computer programs stored in memory 142. As an example, processing circuitry 140 may comprise one or more hardware-implemented state machines (e.g., in discrete logic, FPGA, ASIC, etc.), programmable logic together with appropriate firmware, one or more stored-program, general-purpose processors, such as a microprocessor or Digital Signal Processor (DSP), together with appropriate software, or any combination of the above. Processing circuitry 140 is generally configured to control the operations and functions of the RFID assembly 30 and SCO station 10 according to the data and instructions stored in memory 142. This includes being controlled to perform the previously described functions in accordance with the code and logic comprising control application 146.

For example, according to the present embodiments, processing circuitry 140 controls the RFID assembly 30 to, inter alia, direct radio frequency (RF) energy through an aperture of one or more aperture plates into a scan zone and vary a size of the scan zone by electrically modifying an effective size of the aperture in one of the aperture plates. More particularly, electrically connecting the aperture plate to a ground circuit decreases the effective size of the aperture in the aperture plate, and thereby decreases the size of the scan zone. On the other hand, electrically isolating the aperture plate from the ground circuit increases the effective size of the aperture in the aperture plate, thereby increasing the size of the scan area. In this manner, processing circuitry 140 can dynamically control the SCO station 10 to selectively switch between a "buy" mode of operation (i.e., a decreased scan zone area) and an "audit" mode of operation (i.e., an increased scan zone area).

The memory 142 is operatively connected to processing circuitry 140 and may comprise any non-transitory machine-readable media known in the art. Such media includes, but is not limited to, SRAM, DRAM, DDRAM, ROM, PROM, EPROM, Flash memory, and the like. As stated above, memory 142 stores the control application 146 that, when executed by processing circuitry 140, configures RFID assembly 30 and SCO station 10 to perform the functions previously described. In one embodiment, memory 142 comprises circuitry that is positioned on the inside of SCO station 10. In other embodiments, however, memory 142 comprises memory that is at least partially disposed exterior to SCO station 10. Thus, in at least some embodiments, memory 142 may comprise an external database or other storage device communicatively connected to SCO station 10.

The User I/O interface 144 comprises one or more devices that allow a customer or other user to interact with, and control the operation of, SCO station 10 in accordance with the present embodiments. Such devices include, but are not limited to, display devices (including display 26 and/or other display devices equipped with a touchscreen), keyboards, keypads, scan zone 24, and payment transaction area 28.

The RFID assembly 30, as stated above, comprises one or more aperture plates, such as aperture plates 40, 80, an insulator 86 for alternately electrically isolating and electrically connecting the aperture plates 40, 80, and the RFID antenna 60. Additionally, this embodiment of RFID assembly 30 also comprises one or more motors 148 configured to rotate the aperture plates 40, 80 and/or insulator 86, as well as one or more switches, represented abstractly in this figure as switches 38, 39. According to the present disclosure, processing circuitry 140 is configured to control the operation of each of these components to direct RF energy (e.g., the RF interrogation signals) through the aperture(s) of the aperture plate(s) into the scan zone, and to actively vary the size of the scan zone by electrically modifying the effective size of the aperture in one of the aperture plates, as previously described.

FIG. 9 is a functional block diagram illustrating a computer program product, such as control program 146, configured to control RFID-enabled SCO station 10 according to one embodiment of the present disclosure. As seen in FIG. 9, control program 146 comprises an RFID antenna control unit/module 150, a scan zone adjuster control unit/module 152, a proximity detection unit/module 154, a timer unit/module 156, and an I/O unit/module 158. Each of the unit/modules comprises computer instructions that, when executed by processing circuitry 140, configure SCO station 10 and/or RFID assembly 30 to function as previously described.

More particularly, the RFID antenna control unit/module 150 comprises instructions that, when executed by processing circuitry 140, causes RFID antenna 60 transmit RF interrogation signals, such as an RFID interrogation signal, for example, through the aperture(s) of one or more aperture plates, such as aperture plates 40, 80.

The scan zone adjuster control unit/module 152 comprises instructions that, when executed by processing circuitry 140, varies the size of the scan zone 24. To accomplish this, the instructions, when executed by processing circuitry 140, cause processing circuitry to selectively and dynamically control one or both of the motor 148 and electrical switches 38, 39 to electrically connect an aperture plate to a ground circuit 36, and to electrically isolate the aperture plate from the ground circuit 36. As stated above, the electrical connection/isolation functions increase and decrease the effective size of the aperture in the aperture plate, thereby increasing and decreasing the size of the scan area 24.

The proximity detection unit/module 154 comprises instructions that, when executed by processing circuitry 140, detects the presence of a user proximate SCO station 10. In response to such detection, processing circuitry 140 generates one or more control signals to control the operation and functions of RFID assembly 30 and SCO station 10, a previously described.

The timer unit/module 156 comprises instructions that, when executed by processing circuitry 140, starts and stops one or more timers that are utilized by processing circuitry 140 to dynamically electrically connect, and electrically isolate, the aperture plate to and from a ground circuit.

The I/O unit/module 158 comprises instructions that, when executed by processing circuitry 140, causes processing circuitry 140 to output information and data to display 26. Such information and data includes, but is not limited to, the data and information retrieved from the RFID tags of one or more products that were read when scan zone 24 was decreased in size and when scan zone 24 was increased in size.

The present embodiments may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method comprising:
   directing radio frequency (RF) energy through an aperture of a plate into a scan zone, wherein the plate comprises a RF shutter region surrounding a periphery of the aperture; and
   varying a size of the scan zone by electrically modifying an effective size of the aperture in the plate;
   wherein electrically modifying an effective size of the aperture in the plate comprises selectively electrically connecting the plate to, and electrically isolating the plate from, a ground circuit wherein:
      electrically connecting the plate to the ground circuit decreases the effective size of the aperture in the plate;
      electrically isolating the plate from the ground circuit increases the effective size of the aperture in the plate; and
      wherein selectively electrically connecting the plate to, and electrically isolating the plate from, the ground circuit comprises selectively rotating the plate into and out of electrical contact with the ground circuit;
   wherein electrically modifying an effective size of the aperture in the plate comprises selectively switching the plate between a first operating mode in which the RF shutter region is configured to block the RF energy from passing through the RF shutter region, and a second operating mode in which the RF shutter region is configured to allow the RF energy to pass through the RF shutter region;
   wherein selectively switching the plate into the first operating mode comprises electrically connecting the plate to a ground circuit, and wherein selectively switching the plate into the second operating mode comprises electrically isolating the plate from the ground circuit;
   wherein the plate comprises a first plate and wherein the aperture comprises a first aperture, the method further comprising electrically connecting a second plate having a second aperture to a ground circuit such that the second aperture is vertically aligned with the first aperture along a longitudinal axis;
   proving an insulator between the first and second plates, wherein the insulator surrounds the first and second apertures and comprises one or more through-holes, and wherein each through-hole is configured to allow an electrically conductive detent extending from one of the first and second plates to contact the other of the first and second plates; and
   wherein electrically modifying the effective size of the first aperture comprises:
      rotating the insulator such that at least one detent extending from the one of the first and second plates extends through a corresponding through-hole in the insulator and contacts the other of the first and second plates thereby electrically connecting the first plate to the ground circuit; and
      rotating the insulator such that the at least one detent contacts a surface of the insulator thereby electrically isolating the first plate from the ground circuit.

2. The method of claim 1, wherein electrically modifying an effective size of the aperture in the plate comprises electrically modifying the effective size of the first aperture by:
   electrically connecting the first plate to the second plate thereby decreasing the effective size of the first aperture; and
   electrically isolating the first plate from the second plate thereby increasing the effective size of the first aperture.

3. The method of claim 1, wherein electrically modifying an effective size of the aperture in the plate comprises electrically modifying the effective size of the first aperture by selectively rotating at least one of the first and second plates relative to the other of the first and second plates.

4. The method of claim 1, wherein electrically modifying an effective size of the aperture in the plate further comprises electrically modifying the effective size of the first aperture by selectively adjusting a vertical distance between the first and second plates.

5. The method of claim 1, wherein electrically modifying an effective size of the aperture in the plate comprises electrically modifying the effective size of the first aperture by selectively rotating the insulator disposed between the first and second plates thereby selectively bringing the first plate into and out of electrical contact with the ground circuit.

6. A self-checkout (SCO) station comprising:
   a plate comprising:
      an aperture; and
      a radio frequency (RF) shutter region surrounding a periphery of the aperture;
   a RF antenna configured to emit RF energy through the aperture into a scan zone; and
   processing circuitry configured to:
      vary a size of the scan zone by electrically modifying an effective size of the aperture in the plate;

wherein to electrically modifying the effective size of the aperture in the plate, the processing circuitry is configured to selectively electrically connect the plate to, and electrically isolate the plate from, a ground circuit wherein:
  electrically connecting the plate to the ground circuit decreases the effective size of the aperture in the plate;
  electrically isolating the plate from the ground circuit increases the effective size of the aperture in the plate; and
  wherein to selectively electrically connect the plate to, and electrically isolate the plate from, the ground circuit, the processing circuitry is configured to selectively rotate the plate into and out of electrical contact with the ground circuit;
  wherein to electrically modify the effective size of the aperture in the plate, the processing circuitry is configured to selectively switching the plate between a first operating mode in which the RF shutter region is configured to block the RF energy from passing through the RF shutter region, and a second operating mode in which the RF shutter region is configured to allow the RF energy to pass through the RF shutter region;
  wherein to selectively switch the plate into the first operating mode, the processing circuitry is configured to electrically connect the plate to a ground circuit, and wherein to selectively switch the plate into the second operating mode, the processing circuitry is configured to electrically isolate the plate from the ground circuit; and
  wherein the plate comprises a first plate and wherein the aperture comprises a first aperture, and wherein the processing circuitry is configured to electrically connect a second plate having a second aperture to a ground circuit such that the second aperture is vertically aligned with the first aperture along a longitudinal axis;
an insulator between the first and second plates, wherein the insulator surrounds the first and second apertures and comprises one or more through-holes, and wherein each through-hole is configured to allow an electrically conductive detent extending from one of the first and second plates to contact the other of the first and second plates; and
wherein to electrically modifying the effective size of the first aperture, the processing circuitry is configured to:
  rotate the insulator such that at least one detent extending from the one of the first and second plates extends through a corresponding through-hole in the insulator and contacts the other of the first and second plates thereby electrically connecting the first plate to the ground circuit; and
  rotate the insulator such that the at least one detent contacts a surface of the insulator thereby electrically isolating the first plate from the ground circuit.

7. The SCO station of claim 6, wherein to electrically modify the effective size of the first aperture, the processing circuitry is configured to:
  electrically connect the first plate to the second plate thereby decreasing the effective size of the first aperture; and
  electrically isolate the first plate from the second plate thereby increasing the effective size of the first aperture.

8. The SCO station of claim 6, wherein to electrically modify the effective size of the first aperture, the processing circuitry is further configured to selectively rotate at least one of the first and second plates relative to the other of the first and second plates.

9. A non-transitory computer readable medium comprising a computer program stored thereon, the computer program comprising instructions that, when executed by processing circuitry of a self-checkout (SCO) station, causes the SCO station to:
  direct radio frequency (RF) energy through an aperture of a plate into a scan zone, wherein the plate comprises a RF shutter region surrounding a periphery of the aperture; and
  vary a size of the scan zone by electrically modifying an effective size of the aperture in the plate;
  wherein to electrically modifying the effective size of the aperture in the plate, the instructions further cause the SCO station to selectively electrically connect the plate to, and electrically isolate the plate from, a ground circuit wherein:
    electrically connecting the plate to the ground circuit decreases the effective size of the aperture in the plate;
    electrically isolating the plate from the ground circuit increases the effective size of the aperture in the plate; and
    wherein to selectively electrically connect the plate to, and electrically isolate the plate from, the ground circuit, the instructions further cause the SCO station to selectively rotate the plate into and out of electrical contact with the ground circuit;
  wherein to electrically modify the effective size of the aperture in the plate, the instructions further cause the SCO station to selectively switch the plate between a first operating mode in which the RF shutter region is configured to block the RF energy from passing through the RF shutter region, and a second operating mode in which the RF shutter region is configured to allow the RF energy to pass through the RF shutter region;
  wherein to selectively switch the plate into the first operating mode, the instructions cause the SCO station to electrically connect the plate to a ground circuit, and wherein to selectively switch the plate into the second operating mode, the instructions cause the SCO station to electrically isolate the plate from the ground circuit;
  wherein the plate comprises a first plate and wherein the aperture comprises a first aperture, and wherein the instructions cause the SCO station to electrically connect a second plate having a second aperture to a ground circuit such that the second aperture is vertically aligned with the first aperture along a longitudinal axis;
  wherein an insulator is disposed between the first and second plates, and wherein the insulator surrounds the first and second apertures and comprises one or more through-holes, and wherein each through-hole is configured to allow an electrically conductive detent extending from one of the first and second plates to contact the other of the first and second plates; and
  wherein to electrically modify the effective size of the first aperture, the instructions cause the SCO station to:
    rotate the insulator such that at least one detent extending from the one of the first and second plates extends through a corresponding through-hole in the insulator and contacts the other of the first and second plates thereby electrically connecting the first plate to the ground circuit; and rotate the insulator such that the at least one detent contacts a surface of the insulator thereby electrically iolating the first plate from the ground circuit.

* * * * *